United States Patent [19]
Ernisse et al.

[11] 3,812,498
[45] May 21, 1974

[54] SHUTTER DIAPHRAGM APPARATUS FOR CAMERA EXPOSURE CONTROL

[75] Inventors: Paul Justin Ernisse; Fredric Alton Mindler, both of Rochester, N.Y.

[73] Assignee: Eastman Kodak Company, Rochester, N.Y.

[22] Filed: Mar. 26, 1973

[21] Appl. No.: 345,056

Related U.S. Application Data

[63] Continuation of Ser. No. 178,130, Sept. 7, 1971, abandoned.

[52] U.S. Cl. ............................................... 354/29
[51] Int. Cl. ............................................ G03b 7/14
[58] Field of Search......... 95/10 CE, 10 CT, 10 CD, 95/6 D

[56] References Cited
UNITED STATES PATENTS 3,416,421  12/1968  Biederman et al...................... 95/10
3,246,585  4/1966  Scudder................................. 95/10

Primary Examiner—Samuel S. Matthews
Assistant Examiner—Michael L. Gellner
Attorney, Agent, or Firm—John J. Palmer

[57] ABSTRACT

Shutter-diaphragm apparatus having an exposure aperture of preselected size and an apertured member biased for movement relative to the exposure aperture as the apparatus is actuated for adjusting the size of the exposure aperture during selected scene light intensity conditions. A second member, also biased for movement as the apparatus is actuated, retains a shutter blade in a closed condition. The second member actuates a light responsive electronic circuit which controls the movement of the apertured member and controls the movement of the shutter blade in timed relation to actuation of the circuit for providing an exposure related to scene light intensity which has been adjusted for delays in operation of the apparatus.

4 Claims, 5 Drawing Figures

PAUL J. ERNISSE
FREDRIC A. MINDLER
INVENTORS

ATTORNEYS

PAUL J. ERNISSE
FREDRIC A. MINDLER
INVENTORS

BY
ATTORNEYS ated by a preselected amount. The error arises from the fact that the photosensitive element has a response characteristic which is substantially nonlinear, and the electronic circuit is calibrated to respond most accurately to the photosensitive element when it is operating in a substantially linear region of its characteristic curve. Apparatus is known whereby the exposure aperture and shutter speed are set automatically as a function of scene light, and the light incident onto the photosensitive element is filtered to compensate for the reduced exposure aperture dimension. However, these systems use complex and elaborate electronic and mechanical apparatus.

SHUTTER DIAPHRAGM APPARATUS FOR CAMERA EXPOSURE CONTROL

This is a continuation, of application Ser. No. 178,130 filed Sept. 7, 1971, now abandoned.

BACKGROUND OF THE INVENTION

1. Field of the Invention

This invention relates to exposure control systems for use in cameras, and more particularly to an exposure control system wherein the size of an exposure aperture, the size of an aperture admitting light to a photosensitive element and exposure time are controlled, based on the intensity of incident scene light.

2. Description of the Prior Art

In cameras providing for automatic or semiautomatic control of shutter-diaphragm apparatus, an exposure aperture opening is often set with the best estimate of light intensity, and a shutter is opened and closed automatically based on the intensity of light available, or vice-versa. The exposure aperture size may be controlled in many ways, for example by a mechanical coupling which sets the aperture as a lens is moved to focus the scene to be photographed. The automatic control of such apparatus may equally be controlled in many ways, but is most often accomplished by the use of electronic switching circuitry utilizing a photosensitive element as a controlling element in the circuit. The photosensitive element has an impedance that varies inversely with the intensity of the scene light incident thereon. It is known that when using such a photosensitive element, that error will result, and consequently improper exposure, if the exposure aperture has been reduced in size, and correspondingly the amount of light striking the photosensitive element is not attenuated by a preselected amount. The error arises from the fact that the photosensitive element has a response characteristic which is substantially nonlinear, and the electronic circuit is calibrated to respond most accurately to the photosensitive element when it is operating in a substantially linear region of its characteristic curve. Apparatus is known whereby the exposure aperture and shutter speed are set automatically as a function of scene light, and the light incident onto the photosensitive element is filtered to compensate for the reduced exposure aperture dimension. However, these systems use complex and elaborate electronic and mechanical apparatus.

SUMMARY OF THE INVENTION

Therefore it is an object of the present invention to provide improved exposure control apparatus for use with photographic cameras that is operative over a wide range of scene light intensity levels.

It is another object of the present invention to provide a simple, economical shutter-diaphragm control apparatus.

It is another object of the present invention to provide improved shutter-diaphragm apparatus wherein the light incident upon the photosensitive element is regulated in relation to the size of the exposure aperture formed.

It is a further object of the present invention to provide shutter-diaphragm control apparatus which automatically reduces the diaphragm, the amount of light incident upon the photosensitive element, and the exposure interval based on the intensity of the incident scene light.

These and other objects are accomplished in accordance with one illustrative embodiment of the present invention by shutter-diaphragm apparatus including an electronic circuit having photosensitive means for detecting scene brightness, and for actuating a transducer for controlling movement of an apertured member to form a reduced exposure aperture when scene light intensity is above a preselected intensity level and to attenuate the photosensitive means in accordance with the aperture thus formed. Upon selection of the proper aperture, the electronic circuit actuates a second transducer to control a shutter blade for uncovering and covering the aperture thus formed, in accordance with the intensity level of scene light.

In a preferred embodiment of the invention, a member having two apertures is movable relative to the exposure aperture and the photosensitive element for reducing the exposure aperture size and for attenuating the photosensitive element to compensate for the reduced aperture thus formed. A pivotal member is actuatable by the first transducer when scene light is below a preselected intensity level for preventing movement of the apertured member to form the exposure aperture of reduced size. An actuatable time delay circuit including the photosensitive means provides a timed exposure interval for actuating of the second transducer to close the shutter blade. The second transducer is energized prior to actuation of the timing circuit; however, a detent engages the shutter blade for retaining the shutter blade in the closed position, and releases the shutter blade to permit it to open substantially simultaneously with the actuation of the time delay circuit.

BRIEF DESCRIPTION OF THE DRAWINGS

In a detailed description of the preferred embodiment of the invention presented herein, reference is made to the accompanying drawings in which.

DETAILED DESCRIPTION OF THE PREFERRED EMBODIMENT

Because cameras are well known, the present description will be directed in particular to elements forming part of or cooperating more directly with the present invention. The camera elements not specifically shown or described may take forms well known to those skilled in the art.

Figure 1:
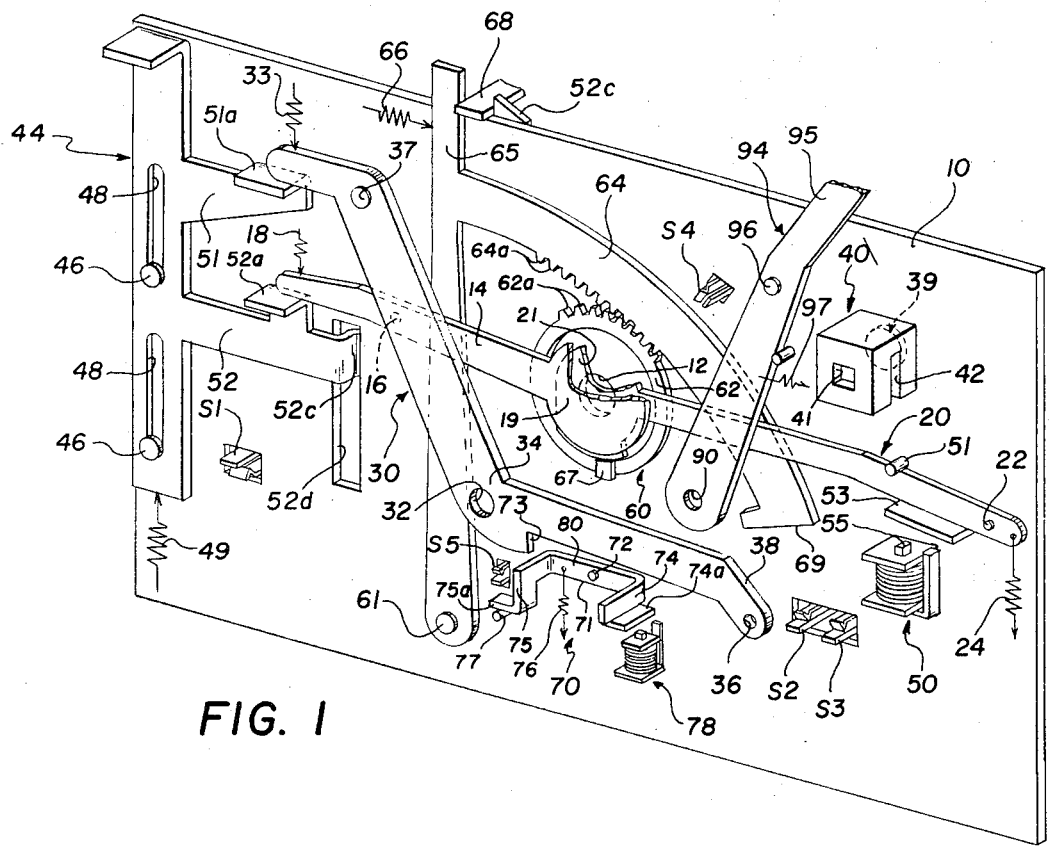
FIG. 1 is a perspective view of the shutter-diaphragm apparatus of the present invention, shown in a cocked position.

Referring now to the drawings, and in particular to FIG. 1, there is shown a camera base plate 10 defining an exposure aperture 12 for the passage of scene light therethrough. Two shutter blades are shown in a closed condition, each movable into and out of a blocking position relative to the exposure aperture 12. A first or safety shutter blade 14, having a disc 19 on one end thereof, is pivotal on a pin 16 under the bias of a spring 18 for moving the disc 19 relative to exposure aperture 12 for preventing an unwanted exposure prior to camera actuation. A second or controlled shutter blade 20, is pivotal on a pivot pin 22 against the bias of a spring 24, and includes a disc 21, on one end thereof, disposed between the disc 19 and the exposure aperture 12 for movement into and out of a blocking position relative to the exposure aperture 12.

Figure 3:
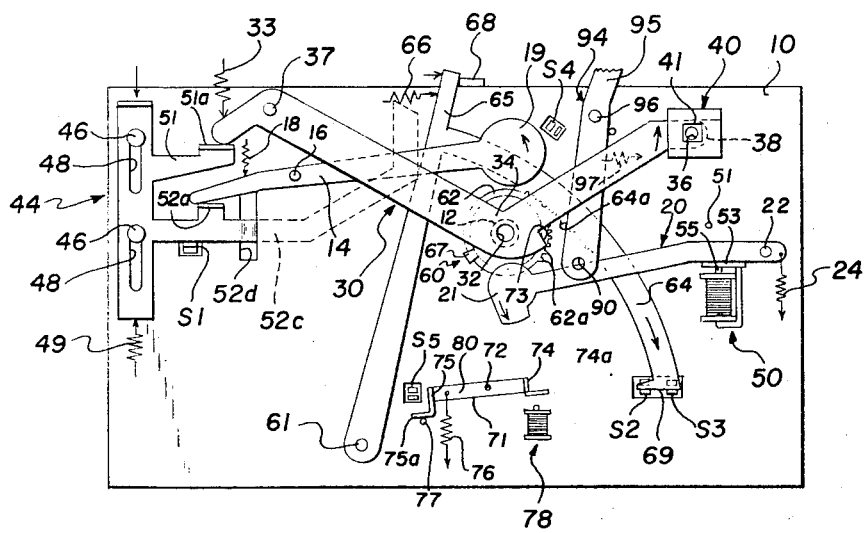
FIG. 3 is an elevational view of the apparatus of FIG. 1 showing an apertured member in a position wherein the exposure aperture dimensions are reduced, and the amount of light incident onto the photosensitive element has been attenuated.

The illustrated apparatus of FIG. 1 provides for variation in the size of the exposure aperture 12 by means of an irregularly shaped, apertured member 30, which defines a first aperture 32 at an elbow 34 thereon, and a second aperture 36 on one end 38. The apertured member 30 is pivotal on a second end 35 about a pin 37, in a counterclockwise direction under the influence of a spring 33. As shown in FIG. 3, the elbow 34, and consequently the aperture 32 is movable angularly relative to the exposure aperture 12, for aligning the aperture 32 with the apertures for reducing the size of the exposure aperture 12. The aperture 36 is simultaneously movable relative to a photosensitive element such as a photocell 39, which may for example be a cadmium sulfide cell, or the like, having an electrical impedance which varies inversely as the intensity of scene light varies. The aperture 36 attenuates incident scene light onto the photocell 39 when the aperture 32 is coincident with the exposure aperture 12. The photocell 39 may be encased in a housing 40 which may include an aperture 41 for passing scene light therethrough to permit impingement of the light onto the photocell 39. In the embodiment disclosed, a notch 42 is provided in the housing 40 for receiving the apertured end 38 as the end 38 is moved relative to the photocell 39. The movement of the end 38 into the notch 42 aligns the aperture 36, which is smaller than the aperture 41, with the aperture 41, thereby reducing the amount of light incident onto the photocell 39. The particular amount of attenuation or reduction required may be calculated by well known techniques and is, of course, dependent upon relative size of the apertures formed.

The apertured member 30 is released for movement by means of a camera release lever 44 which is mounted for axial movement on a pair of pins 46 received in a pair of slots 48 on the base plate 10. The release lever 44 is movable against the bias of a spring 49 and may include a portion exterior to the camera for manual actuation. A switch S1 is associated with the release lever 44 such that initial movement of the release lever 44 actuates the switch S1 to the closed position. A pair of projections 51 and 52, on the release lever 44, define tabs 51a and 52a which are disposed to engage and retain the apertured member 30 and the safety shutter 14 against the bias of the springs 18 and 33, when the apparatus is in the cocked position as shown in FIG. 1. Axial movement of the release lever 44 as shown in FIG. 3, moves the projections 51 and 52 downwardly which permits the spring 18 to pivot the safety shutter 14 about pin 16, and permits the spring 33 to pivot the apertured member 30 about pin 37. The shutter blade 20, with the disk 21 disposed between the safety shutter 14 and the exposure aperture 12, is movable into and out of the blocking position relative to the exposure aperture 12, by means of an electromagnet 50 and the spring 24. When the electromagnet 50 is de-energized, the spring 24 maintains the shutter blade 20 in the position of FIG. 1, against a stop pin 51. When energized, the electromagnet 50 attracts a keeper 53, placed adjacent to the electromagnets core 55, thereby pivoting the shutter blade 20 about the pivot pin 22 against the bias of the spring 24, thereby opening the exposure aperture 12 to permit the passage of incident scene light therethrough.

Figure 4:
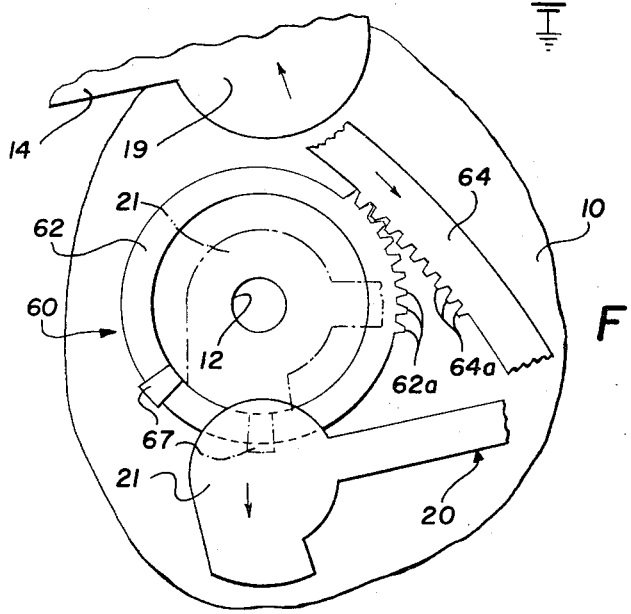
FIG. 4 is an enlarged view showing the operation of a latch mechanism for retaining the shutter blade in an aperture covering position until the electronic circuitry has reached a preselected operating state.

The electromagnet 50 is connected in an electronic circuit, to be described later, to be energized as the switch S1 is closed. Upon initial energization of the electromagnet 50, the shutter blade 20 will not open because, as also shown in FIG. 1, and more clearly shown in FIG. 4, a latch mechanism 60 is provided for preventing the opening of the shutter blade 20 prior to the desired operating state of the electronic circuitry, i.e., the desired flux field of the electromagnet 50. The latch mechanism 60 includes a movable ring 62 having a detent 67 and gear teeth 62a on the periphery thereof, and a pivotal arcuate arm 64, having teeth 64a meshing with the teeth 62a. The arm 64 extends angularly from a post 65, which post 65 is pivotal in a clockwise direction about a pin 61. The post 65 is retained in the position of FIG. 1, against the bias of a spring 66, by means of an extension 52c of the projection 52. The extension 52c extends through a slot 52d of the support plate 10 and engages a biased cocking lever 68 as shown by the phantom lines of FIG. 3. As may be more clearly seen from FIG. 4, the teeth 62a of the ring 62 fit into the tooth spaces 64a of the arm 64 so that as the arm 64 pivots about a pin 61, the ring 62 rotates clockwise. The detent 67 on the ring 62, engages the disk 21 and prevents the shutter blade 20 from opening; however, as shown in FIG. 4, when the ring 62 is rotated, the detent 67 rotates to free the shutter blade 20 and the attractive force of the electromagnet 50 upon the keeper 53 pivots the shutter blade 20, removing the disc 21 to an unblocking position relative to the exposure aperture 12. The arm 64 includes a foot 69 movable in an arcuate manner as the arm 64 pivots, for engaging a pair of switches S2 and S3, when the arm 64 reaches its terminal pivotal position, whereby the switches S2 and S3 are opened substantially simultaneously with the opening of the exposure aperture 12.

The apertured member 30 is adapted to be moved to align the aperture 32 with the exposure aperture 12, when the intensity of the scene light is too high for exposure at the fixed exposure aperture 12. The movement to align the apertures, and consequently retain the size of the exposure aperture 12 is prevented if scene light is below the high level by means of a detent mechanism 70, which is actuatable by an electromagnet 78 in the electronic circuit of FIG. 5. The detent 70 may in the illustrated embodiment, be a yoke member 71, having legs 74 and 75 which are pivotal under the bias of a spring 76, about a pivot pin 72 centered in a yoke base 80. The leg 74 includes a keeper 74a disposed adjacent to, and attractable by the electromagnet 78, so that when attracted by the electromagnet 78, the yoke 71 pivots on the pin 72. The leg 75 is normally biased against a pin 77, and is movable relative to a notch 73 on the elbow 34, so that as the yoke 71 pivots, the leg 75 engages the notch 73, thereby preventing the apertured member 30 from moving to the position wherein the aperture 32 is aligned with the exposure aperture 12.

A second apertured lever 94 is movable relative to the exposure aperture 12 for aligning a third aperture 90 with the exposure aperture 12. An upper end 95 is disposed relative to a flash lamp unit receptacle (not shown) whereby the lever 94 is movable clockwise about a pin 96 by insertion of a flash lamp unit (not shown) into the camera. Clockwise movement of the lever 94 moves the aperture 90 to a position whereby the aperture 90 is aligned with the exposure aperture 12. A switch S4 is disposed relative to the lever 94, for actuation when the lever 94 is actuated to align the apertures 90 and 12.

The relative size of the exposure apertures formed by the exposure aperture 12 or the apertures 32 and 90 are selected, as previously indicated, as a function of the intensity of the incident scene light. The aperture 32, being smaller in dimension than the aperture 12, has a dimension selected as an exposure aperture when conditions of high scene brightness occurs, and the exposure aperture 12 has a dimension selected for an exposure at a lower scene brightness.

The aperture 90 represents an aperture for use with artificial light when the intensity of the scene light is below that which will produce a good exposure without the aid of artificial light. Thus, exposure apertures may be formed that span the full light intensity range encountered in photographing an object scene. Illustratively, photographic exposures made with the apertures thus formed may represent exposures as defined by the customary $f$ numbers, at $f/8$, $f/11$, or an $f/16$ aperture. The $f/8$ aperture representing the largest exposure aperture formed, the $f/11$ aperture representing the aperture formed when the apertured member 30 moves to align the aperture 32 with the exposure aperture 12 and the $f/16$ aperture representing the exposure using artificial lighting equipment.

Figure 5:
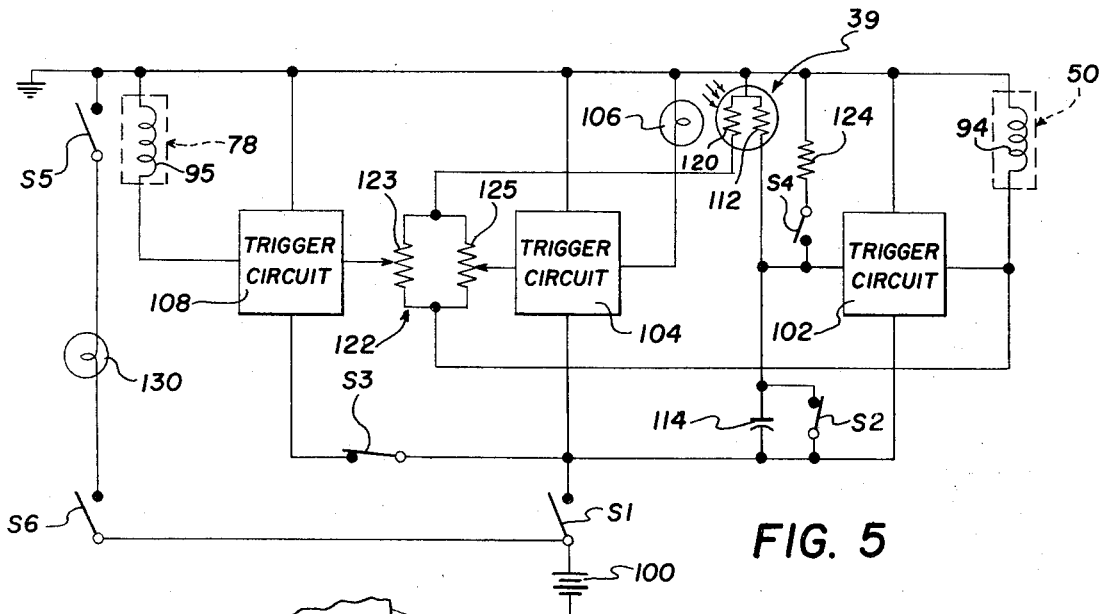
FIG. 5 is an electronic circuit diagram of a suitable circuit for use with the apparatus of FIG. 1.

An electronic circuit suitable for use with the apparatus of FIG. 1, for indicating the need for a specified exposure dimension, for controlling the selection of the exposure aperture, and for controlling the length of the exposure interval is shown in FIG. 5. The circuit is energizable by the closure of the switch S1 as the release lever 44 is slightly actuated axially, and power is supplied to the circuit from a battery 100. Closure of the switch S1 connects the battery 100 in circuit with a trigger circuit 102 such as, for example, a Schmitt trigger, and the trigger circuit 102 is switched from a non-conducting state to a conducting state. A second trigger circuit 104 is provided, which may also be a Schmitt trigger, and which is adapted to be in a conducting state when the scene light is too low for proper exposure. The trigger circuit 104 controls the energization or de-energization of a lamp 106, which lamp 106 is indicative of the level of scene brightness. A third trigger circuit 108, which is adapted to be energized when scene light is of an intensity level requiring an extended exposure interval. The trigger circuit 102 controls the energization of the electromagnet 50 while the trigger circuit 108 controls the energization of the electromagnet 78.

The three trigger circuits 102, 104, and 108 are controlled in accordance with the intensity of the scene light by means of the photosensitive element 39 arranged in the camera to receive the scene light and having an electrical resistivity which varies inversely with the amount of scene light incident thereon. The photosensitive element 39 includes a first element 112, connected in circuit with a capacitance 114 and the battery 100 to thereby form a conventional R-C voltage integrating network the time constant of which is dependent upon the capacitance of the capacitor 114, and the resistance of the element 112 as established by the intensity of the scene light incident thereon. The capacitor 114 is normally shunted to ground by the switch S2 connected in circuit at a junction 118, between the element 112 and the capacitor 114. When the switch S2 is opened, the rise time of the voltage at the junction 118, being dependent upon the intensity of the scene light, and being coupled to the input of the trigger circuit 102, controls the triggering thereof at varying time intervals dependent upon the intensity of the scene light. The switch S2 is opened by the foot 69, simultaneously with the opening of the exposure aperture 12, and upon opening the switch S2, the voltage at the junction 118, will rise approximately exponentially; therefore, the trigger circuit 102 will be switched from its normally conductive state to its non-conductive state in a time period depending upon the scene light intensity. The electromagnet 50 will be energized or de-energized according to current flow in the coils 92, being in circuit with the output stage of the trigger circuit 102. For a high scene light intensity the resistance of the element 112 will be low, consequently, a short time constant, and conversely if the scene light intensity is low, the resistivity of the element 112 will be high producing a longer time-constant.

Conduction of the trigger circuits 104 and 108 is dependent upon the scene light incident onto a second element 120, such as the element 112 of the photosensitive element 39. The second element 120 is coupled in circuit with the battery 100 and a parallel variable resistance 122, in which one resistor 123 of the parallel combination controls current to the input of the trigger circuit 108, and a second resistance 125 of the parallel combination controls the current to the input of the input of the trigger circuit 104. The variable resistors 123 and 125, in circuit with the element 112 form voltage divider networks which are input to the trigger circuits 104 and 108 and accordingly bias the trigger circuit to be conducting, in the case of trigger circuit 104 when the scene light intensity is low, and in the case of the trigger circuit 108 when the scene light intensity is a nominal light. When the trigger circuit 104 is in a conductive state, the lamp 106 will be energized thereby indicating to a camera operator that the scene light intensity is too low for normal exposure. The operator, therefore, has the option of using the timed exposure or actuating the flash aperture lever 94 by inserting an appropriate flash lamp unit into a camera receptical (not shown). The trigger circuit 108 is adapted to be in the conductive state when the scene light is below a high intensity level, however, not low enough for photoflash equipment to be used. In the event that the scene light is such that the trigger circuit 108 is rendered conductive, current flowing through coils 97 in the output circuit of trigger circuit 108 will energize the electromagnet 78, thereby preventing the movement of the apertured member 30 to reduce the size of the exposure aperture 12. The switch, S2 which is opened by the foot 69 as the shutter blade 20 opens, is adapted to disconnect the trigger circuit 108 from the closed circuitry of trigger circuit 102, thereby removing any influence that the trigger circuit 108 may have on the timing cycle as established by the element 112 and the capacitor 114. Although S3 is opened, the frictional force of the mechanical engagement of the notch 93 with the arm 75 will retain the aperture member 30 in the position shown in FIG. 3.

When the light conditions are too low for exposure without the aid of artificial light, and the operator inserts the flash lamp unit, the switch S4 is closed wherein a fixed resistance 124 is connected between the battery 100 and the input of the trigger circuit 102. The resistance 124 sets a fixed time-constant as established by the resistance 124 and the capacitor 114. The fixed time constant is established in accordance with the time interval that the aperture 12 is to be opened relative to the useful length of the flash lamp illumination. The electromagnet 50 is accordingly energized and de-energized within the time period which establishes the correct opening and closing time of the exposure aperture for flash photography.

The switches S1 – S5 are shown positioned to be suitably mounted on the reverse side of the plate 10 and having contacts protruding therethrough for engagement by their respective operative members. However, it will be appreciated by one skilled in the art that actuation of the respective switches is not relative to the form of mounting used.

Figure 2:
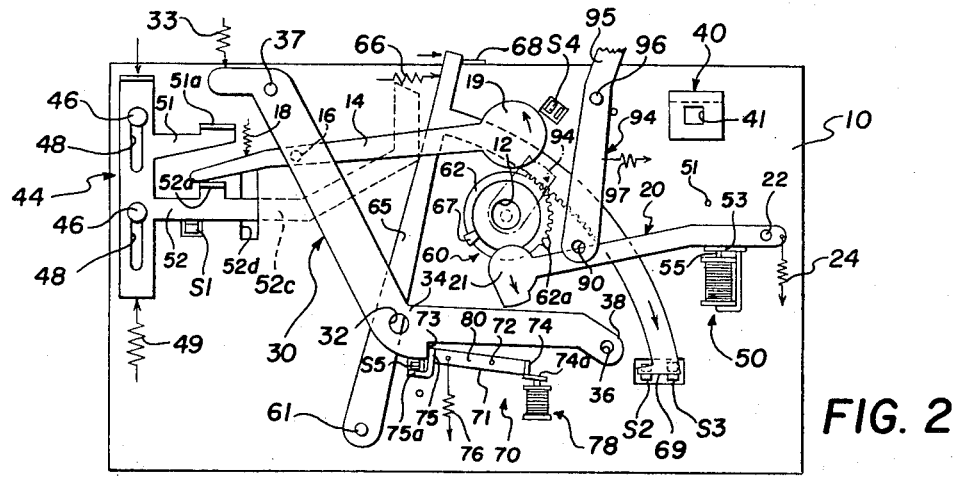
FIG. 2 is an elevational view of the apparatus of FIG. 1 in a condition to provide an exposure in average light conditions.

With reference to FIGS. 1, 2 and 3, the following sequence takes place, and depending upon the state of the electronic circuit of FIG. 5, one of the three exposure apertures will be formed. Initially, the operator partially depresses the release lever 44 which closes the power switch S1. The closure of the power switch S1 energizes the trigger circuit 102 and, depending upon the intensity level of the scene light, will energize the trigger circuits 104 and 108. The lamp 106 will be energized in the event that the scene light intensity is too low for normal or timed exposure. In the event that the lamp 106 does not become energized when the release lever 44 is slightly depressed, the operator continues to depress the release lever 44 thereby releasing the apertured member 30, and the safety shutter 14 for initial movement in a counterclockwise direction under the bias springs 33 and 18 respectively. This operation is shown in FIG. 3. As may best be seen by reference to FIG. 2, in the event that scene light is in the range below high intensity but above the low-light condition, the bias established by the resistor 123 and the element 120 biases the trigger circuit 108 to the conductive state. The electromagnet 78 having its coils 97 in the output circuit thereof becomes energized and the keeper 74a is accordingly attracted to the electromagnet 78 and the yoke 71 is pivoted about the pivot pin 72. As the yoke 71 pivots, the leg 75 engages the notch 73 of the apertured member 30, thereby preventing the apertured member 30 from moving to align the aperture 36 with the exposure aperture 12, thus keeping the exposure aperture 12 at the largest dimension.

When the switch S1 is initially closed, the trigger circuit 102, normally in a nonconductive state, is switched to a conductive state and accordingly energizes the electromagnet 50. When the electromagnet 50 becomes energized, it attracts the keeper 53 on the shutter blade 20 thereby attempting to pivot the shutter blade 20 in a counterclockwise direction for exposing the exposure aperture 12 to incident scene light. However, the latch mechanism 60 momentarily prevents the shutter blade 20 from opening prior to the selected energization level of the electromagnet 50. The operation of the latch member 60 may best be seen from FIG. 4. As the operator depresses the release lever 44 the extension 68 releases the post 65 for movement about the pin 61, under the bias of the spring 66. As the post 65 pivots about the pin 61, the gear teeth 62a and 64a move within the tooth spaces of each, rotating the ring 62 and removing the detent 67 from the latching position so that the blade 20 accordingly moves in a counterclockwise direction due to the attraction of the keeper 53 for the electromagnet 50. As the arm 64 reaches a final position, the foot 69 engages the switches S2 and S3 opening both simultaneously with the opening of the exposure aperture 12, thereby starting the timing cycle substantially simultaneously with the opening of the exposure aperture 12. After a time interval, as established by the element 112 and the capacitance 114 as previously described, a voltage level has built up at the junction 118 and the trigger circuit 102 will be switched from its normally conducting state to a non-conducting state, thereby de-energizing the electromagnet 50. When the electromagnet 50 becomes de-energized it releases the keeper 53 and the spring 24 closes the shutter blade, wherein the disk 21 covers the aperture 12 for preventing the passage of scene light therethrough.

In the event that scene light is high as best seen in FIG. 3, the trigger circuit 108 which in the normal scene light conditions is in a conductive state, would in the high scene light be non-conductive and the electromagnet 78 accordingly would not be energized and the yoke 71 remains as in the position shown in FIG. 1. Therefore, the apertured member 30 pivots about the pin 37, under the bias of the spring 33, as the operator depresses the release lever 44, and the aperture 32 is moved into alignment with the exposure aperture 12, thereby reducing the size of the exposure aperture 12 in accordance with the high scene brightness. Operation of the circuit 102, and other members of the circuitry, would be as previously described. During periods of low scene light intensity the lamp 106 will be energized indicating the need for artificial light in order to make a proper exposure. Under these conditions, as shown by the phantom lines of FIG. 2, the lever 94 is actuated by insertion of the flash lamp unit, which pivots the lever 94 about its pivot pin 96, bringing the aperture 90 into alignment with the exposure aperture 12. Movement of the lever 94 to align the aperture 90 with the exposure aperture 12, actuates the switch S4 to the closed position, thereby connecting the fixed resistor 124 in series with the capacitor 114 for establishing a fixed time constant for the circuit 102, for energizing and de-energizing the electromagnet 50, thereby opening and closing the exposure aperture in a fixed time interval based on the flash equipment used.

A tab 75a of the arm 75 is shown adjacent to a switch S5 and is a means for lighting a lamp 130 that is part of a battery checker. The battery checker feature is explained as follows with reference to FIGS. 1 and 5. The camera operator covers the housing 40 with his hand to shield the photosensitive element 39 from incident light. This action simulates a low light condition to the circuit of FIG. 5, which energizes the electromagnet 78. The electromagnet 78 attracts the keeper 74a pivoting the detent 70 and closing the switch S5. The operator then closes a switch S6. Under these conditions, provided the battery is capable of operating the mechanism, the lamp 130 will be energized thus indicating to the operator that sufficient power is in the battery to operate the mechanism.

The invention has been described in detail with particular reference to preferred embodiment thereof, but it will be understood that variations and modifications can be effected within the spirit and scope of the invention.

We claim:

1. In combination with a camera having an exposure aperture, improved exposure control apparatus for controlling the exposure of film to scene light through said exposure aperture, comprising:

means for actuating a picture taking operation of said camera;

shutter means mounted in said camera for movement between positions blocking and unblocking said exposure aperture;

means for urging said shutter means to said aperture blocking position;

diaphragm means operable for selectively varying the size of said exposure aperture;

first circuit means, including first control means energizable for controlling the operation of said diaphragm means in relation to scene light intensity and second control means energizable for moving said shutter means to said unblocking position and retaining said shutter means in said unblocking position;

light responsive timing circuit means coupled with said first circuit means and being activatable for controlling energization of said second control means for a time interval related to scene light intensity;

first switching means actuatable for energizing said first circuit means and second switching means actuatable for activating said timing circuit means, said first switching means being actuated by said actuating means;

detent means for retaining said shutter means in said blocking position and for actuating said second switching means, said detent means being movable in response to operation of said actuating means for releasing said shutter means a predetermined time after activation of said second control means and operation of said diaphragm means, and for actuating said second switch means in a timed relationship with release of said shutter; and means for moving said detent means to effect release of said shutter means and actuation of said second switch means in timed relation after operation of said diaphragm means and actuation of said first switching means.

2. In combination with a camera having an exposure aperture, improved exposure control apparatus for controlling the exposure of film to said light through said exposure aperture, comprising:

shutter means mounted in said camera for movement between positions blocking and unblocking said exposure aperture;

means for urging said shutter means to said aperture blocking position;

transducer means energizable for moving said shutter means against the force of said urging means from said blocking position to said unblocking position and for holding said shutter means in said unblocking position while energized;

first circuit means activatable for energizing said transducer means;

first switch means for activating said first circuit means in response to a picture taking actuation of said camera;

activatable light responsive timing circuit means, coupled with said first circuit means and operable after activation, for providing a signal to said first circuit means for causing de-energization of said transducer means after a time interval related to scene light intensity;

second switch means activatable for activating said timing circuit means;

detent means for retaining said shutter means in said blocking position after activation of said first circuit means and during initial energization of said transducer, said detent means being movable for releasing said shutter means from said retained condition and including means for actuating said second switch means in timed relation to the release of said shutter means; and means for moving said detent means to effect release of said shutter means and actuation of said second switch means in timed relation after actuation of said first switch means.

3. The invention defined in claim 2 wherein said detent means includes a first member for retaining said shutter and a second member mechanically coupled to said first member for actuating said second switch means.

4. The invention defined in claim 2 further including means for initiating a picture taking operation of said camera and wherein said detent means includes a first member for releasably engaging said shutter means in said closed position thereof, and a second member coupled with said initiating means and said first member, said second member being movable in response to a picture taking action for moving said first member to release said shutter means after a predetermined time after said transducer becomes energized and for actuating said second switch means at a predetermined time in relation to release of said shutter means.

* * * * *